United States Patent
Kawasaki et al.

(10) Patent No.: US 7,681,439 B2
(45) Date of Patent: Mar. 23, 2010

(54) MEASURING APPARATUS

(75) Inventors: Kazuhiko Kawasaki, Tsukuba (JP);
Satoshi Koga, Tsukuba (JP); Yoshimasa Suzuki, Tsukuba (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 245 days.

(21) Appl. No.: 11/892,365

(22) Filed: Aug. 22, 2007

(65) Prior Publication Data

US 2008/0047335 A1    Feb. 28, 2008

(30) Foreign Application Priority Data

Aug. 23, 2006   (JP)  .............................. 2006-226827

(51) Int. Cl.
*G01B 21/30* (2006.01)
(52) U.S. Cl. ........................................................ 73/105
(58) Field of Classification Search ................ 73/105
See application file for complete search history.

(56) References Cited

U.S. PATENT DOCUMENTS

| | | | |
|---|---|---|---|
| 5,172,002 A | 12/1992 | Marshall | |
| 5,324,935 A | 6/1994 | Yasutake | |
| 7,441,447 B2 * | 10/2008 | Degertekin et al. | ............ 73/105 |

FOREIGN PATENT DOCUMENTS

| | | |
|---|---|---|
| EP | 0 387 906 A2 | 9/1990 |
| EP | 0 440 268 A2 | 8/1991 |
| JP | A-05-312563 | 11/1993 |
| JP | A-07-301510 | 11/1995 |
| JP | A-09-061441 | 3/1997 |
| JP | A-09-072924 | 3/1997 |
| JP | A-2002-181687 | 6/2002 |

OTHER PUBLICATIONS

"Optical Atomic Force Sensor," IBM Technical Disclosure Bulletin, IBM Corporation, vol. 32, No. 3a, Aug. 1989, pp. 241-242.

* cited by examiner

*Primary Examiner*—Thomas P Noland
(74) *Attorney, Agent, or Firm*—Oliff & Berridge, PLC (57) ABSTRACT

A measuring apparatus comprising: a reference member held in fixed position and orientation with respect to a workpiece during measurement; a stylus for scanning a surface of the workpiece while being displaced upward and downward in accordance with unevenness of the surface of the workpiece; a displacement gauge for measuring a displacement of a specific part of the stylus relative to the reference member; and a scanner for causing the stylus to scan the workpiece along the surface; wherein the fixed position and orientation of the reference member with respect to the workpiece are not changed even during the operation of the scanner; the up-and-down displacement of the specific part of the stylus is measured relative to the reference member; a fine shape of the workpiece is detected in accordance with the measured displacement of the specific part of the stylus.

8 Claims, 7 Drawing Sheets

MEASURING APPARATUS

RELATED APPLICATIONS

This application claims priority to the Japanese Patent Application 2006-226827 dated on Aug. 23, 2006 and is hereby incorporated with reference for all purposes.

BACKGROUND OF THE INVENTION

1. Field of the Invention

The present invention relates to measuring apparatuses, and more specifically to an improvement in their fine-shape detection mechanism.

2. Prior Art

Fine-shape measuring apparatuses such as scanning probe microscopes have been used conventionally for measuring the fine shapes of workpieces. One type of scanning probe microscope is an atomic force microscope, for instance. The atomic force microscope detects an atomic force acting between the surface of a workpiece and a stylus, and the unevenness of the surface of the workpiece can be detected by scanning the surface of the workpiece in such a manner that the detected atomic force is kept constant (Japanese Unexamined Patent Application Publication No. 2002-181687).

In the fine-shape measuring apparatuses, the displacement of a stylus can be measured in many ways. One example is an optical lever method (Japanese Unexamined Patent Application Publication No. 2002-181687, Japanese Unexamined Patent Application Publication No. Hei-9-72924) utilizing a laser and an optical position-sensitive detector. The measurement may be made by a focus error detection method (Japanese Unexamined Patent Application Publication No. Hei-9-61441). The measurement may also be made by an optical fiber interferometer (Japanese Unexamined Patent Application Publication No. Hei-7-301510, Japanese Patent Publication No. 3081979).

An example of the optical lever method is shown in FIG. 1 of Japanese Unexamined Patent Application Publication No. 2002-181687. In this method, a laser beam is directed to the rear surface of a cantilever, and reflected light is detected by an optical position-sensitive detector located away from the cantilever. When a stylus of the cantilever is displaced up and down in accordance with the unevenness of the surface of the workpiece, the amount of displacement is reflected as an angular change of reflected light. In the optical lever method, the angular change is magnified at a distance and detected by the optical detector. The angular change of the reflected light is detected from a light intensity signal received by the optical detector, and the height of the surface of the workpiece, indicated by the stylus of the cantilever, can be measured accordingly.

In the fine-shape measuring apparatuses, the height of the surface of the workpiece can be measured by scanning the surface of the workpiece and moving the surface of the workpiece relatively up and down in such a manner that the light intensity signal of the optical detector keeps a certain value. Through the detection of the height of the surface of the workpiece as described above, the fine-shape measuring apparatuses can measure the fine shape of the workpiece along a single line or in a two-dimensional area.

The fine-shape measuring apparatuses must measure much finer shapes than those measured in general shape measurement, and therefore, very-high-accuracy measurement is required.

A variety of measuring apparatuses have been proposed to meet this requirement. For instance, the one disclosed in Japanese Unexamined Patent Application Publication No. Hei-7-301510 has a normal trihedral reflector in a probe for the purpose of reducing the adverse effect of torsion in a guide mechanism or the like on the measurement accuracy. A technique suggested in this publication detects the amount of displacement of the probe by measuring the amount of displacement of the normal trihedral reflector by means of a plurality of displacement gauges.

The conventional methods, however, do not provide a sufficient measurement accuracy and have room for further improvement.

The inventors have studied this problem and have found the following: In the measurement performed by scanning on the workpiece, data obtained by a sensor for sensing the height are the sum of the amounts of up-and-down movements of the cantilever in accordance with the shape of the workpiece and the amounts of up-and-down movements of the cantilever, caused by motion errors produced by a scanner.

One conventional method to reduce these measurement errors is to use a high-accuracy scanner with low motion errors. However, it is very difficult to prepare an ideal scanner that is free from motion errors. Even if an ideal scanner could be prepared, it would be very expensive, making it difficult to manufacture an economical apparatus.

Accordingly, the present invention does not use a very-high-accuracy scanner as a means for solving the problem. Another method suggested to eliminate the effect of motion errors produced by the scanner requires a complicated apparatus utilizing a normal trihedral reflector.

Therefore, in the fine shape measurement field, there has been strong demand for the development of a technology that can implement high-accuracy measurement without using a very-high-accuracy scanner. However, no conventional technology has met the demand appropriately.

SUMMARY OF THE INVENTION

The present invention has been provided in view of the problems in the related art described above. An object of the present invention is to provide a measuring apparatus that can perform high-accuracy measurement.

As a result of extensive investigation of the problems by the present inventors, it has been found that the adverse effects of motion errors of the scanner can be reduced by measuring the displacement of a specific part of the stylus, from directly above the specific part of the stylus, relative to a reference member kept in a fixed position and orientation with respect to the workpiece. Therefore high-accuracy measurement can be performed.

<Reference Member>

A measuring apparatus provided to achieve the foregoing object according to the present invention includes a reference member, a stylus, a displacement gauge and a scanner.

The member is held in fixed position and orientation with respect to a workpiece during measurement.

The stylus scans a surface of the workpiece while being displaced upward and downward in accordance with unevenness of the surface of the workpiece.

The displacement gauge measures a displacement of a specific part of the stylus relative to the reference member.

The scanner causes the stylus to scan the workpiece along the surface.

In the present invention, the fixed position and orientation of the reference member with respect to the workpiece are not changed even during the operation of the scanner; the up-and-down displacement of the specific part of the stylus is measured relative to the reference member; a fine shape of the workpiece is detected in accordance with the measured displacement of the specific part of the stylus.

<Relation Between Displacement Axis and Measurement Axis>

In the present invention, it is preferable that the scanner scans the workpiece and the reference member with respect to the stylus and the displacement gauge or causes the stylus and the displacement gauge to travel with respect to the workpiece and the reference member during measurement while a displacement axis representing the direction of the up-and-down displacement of the stylus and a measurement axis along which the displacement gauge measures the displacement of the specific part of the stylus are kept coincident with each other. Because Abbe error can be prevented with reliability, high-accuracy measurement can be performed.

<Interferometric Displacement Gauge>

In the present invention, it is preferable that: the displacement gauge is an interferometric displacement gauge; the reference member is a reference mirror used for the interferometric displacement gauge; at least the reference mirror and the specific part of the stylus are aligned with a displacement axis of the stylus and a measurement axis of the displacement gauge; and the interferometric displacement gauge measures the displacement of the specific part of the stylus in accordance with interference occurring at the reference mirror, between light reflected from the reference mirror, obtained by directing a part of coherent light having a central axis aligned with the displacement axis and the measurement axis towards the reference mirror, and light passing through the reference mirror, reaching the specific part of the stylus, and reflected from the specific part of the stylus.

In the present invention, it is preferable to further comprising a condensing lens.

The condensing lens focuses the coherent light from the reference mirror to the specific part of the stylus, collects reflected light thereof, and emits the light directly upward, onto the measurement axis. The condensing lens travels in a transverse direction together with the stylus.

In the present invention, it is preferable to further comprising a light-shielding plate.

The light-shielding plate blocks light other than light passing through the condensing lens. The condensing lens travels in the transverse direction within the coherent light, which is a collimated light beam.

<Capacitive Displacement Gauge>

In the present invention, it is preferable that: the displacement gauge is a capacitive displacement gauge comprising two flat electrodes; the reference member is one flat electrode of the two flat electrodes; the other flat electrode of the two flat electrodes is provided in the specific part of the stylus; and the capacitive displacement gauge measures the capacitance between the two flat electrodes and measures the displacement of the specific part of the stylus in accordance with the measured capacitance.

In the present invention, it is preferable to further comprising an electrostatic-shielding plate.

The electrostatic-shielding plate is used in measurement of only the capacitance between the reference member and the specific part of the stylus.

As a result, the displacement of just the specific part of the stylus relative to the reference member can be measured.

<Reference Member Size>

In the present invention, it is preferable that the reference member is greater than or equal to the size of a measurement area of the workpiece.

If the size of the reference member is smaller than the workpiece measurement area, there is a possibility that the displacement of the stylus relative to the reference member cannot be measured in some part of the measurement area. With the reference member at least as large as the workpiece measurement area, the displacement of the stylus relative to the reference member can be measured with reliability.

<Stylus>

In the present invention, it is preferable that the stylus is disposed at a free end of a flexible cantilever and is displaced up and down in contact with the workpiece.

If the stylus is kept in contact with the workpiece, even when a motion error occurs, the motion error is absorbed by the flexibility of the cantilever and will not affect the height of the specific part of the stylus, so that the displacement of the stylus varies only in accordance with the unevenness of the surface of the workpiece and can be measured with high accuracy.

<Effect>

A measuring apparatus according to the present invention includes a displacement gauge for measuring the displacement of a specific part of the stylus relative to a reference member held in a fixed position and orientation with respect to the workpiece, so that very-high-accuracy measurement can be performed without using a very-high-accuracy scanner.

According to the present invention, a scanner may scan while the measurement axis of the stylus and the measurement axis of the displacement gauge are kept coincident with each other, so that measurement can be performed with very high accuracy.

According to the present invention, the displacement gauge may be an interferometric displacement gauge and the reference member may be a reference mirror used for the interferometric displacement gauge, so that the measurement can be performed with very high accuracy.

According to the present invention, a condensing lens may travel together with the scanning stylus, so that the measurement can be performed with very high accuracy.

According to the present invention, the condensing lens may scan within a coherent collimated light beam, and a light-shielding plate for blocking light other than light passing through the condensing lens may be provided, so that the measurement can be performed with very high accuracy.

According the present invention, the displacement gauge may be a capacitive displacement gauge, and the reference member may be one flat electrode of the capacitive displacement gauge, so that the measurement can be performed with very high accuracy.

According to the present invention, a static-shielding plate may be further provided, so that the measurement can be performed with very high accuracy.

According to the present invention, the size of the reference member may be greater than or equal to the workpiece measurement area, so that the measurement can be performed with very high accuracy.

According to the present invention, the stylus may be provided on a cantilever, so that the measurement can be performed with very higher accuracy.

DESCRIPTION OF THE PREFERRED EMBODIMENT

Preferred embodiments of the present invention will be described with reference to the drawings.

First Embodiment

Figure 1A:
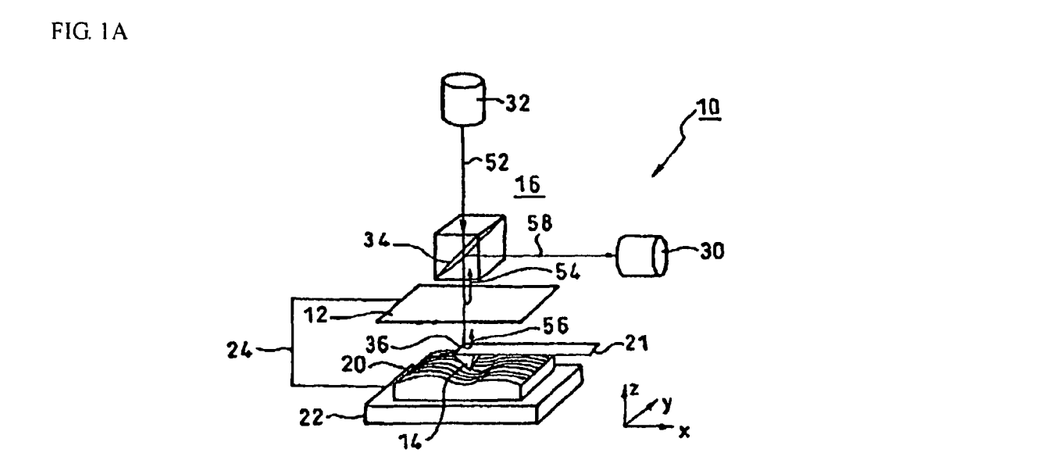
FIGS. 1A and 1B are diagrams illustrating an outline structure of a measuring apparatus according to a first embodiment of the present invention.
Figure 1B:
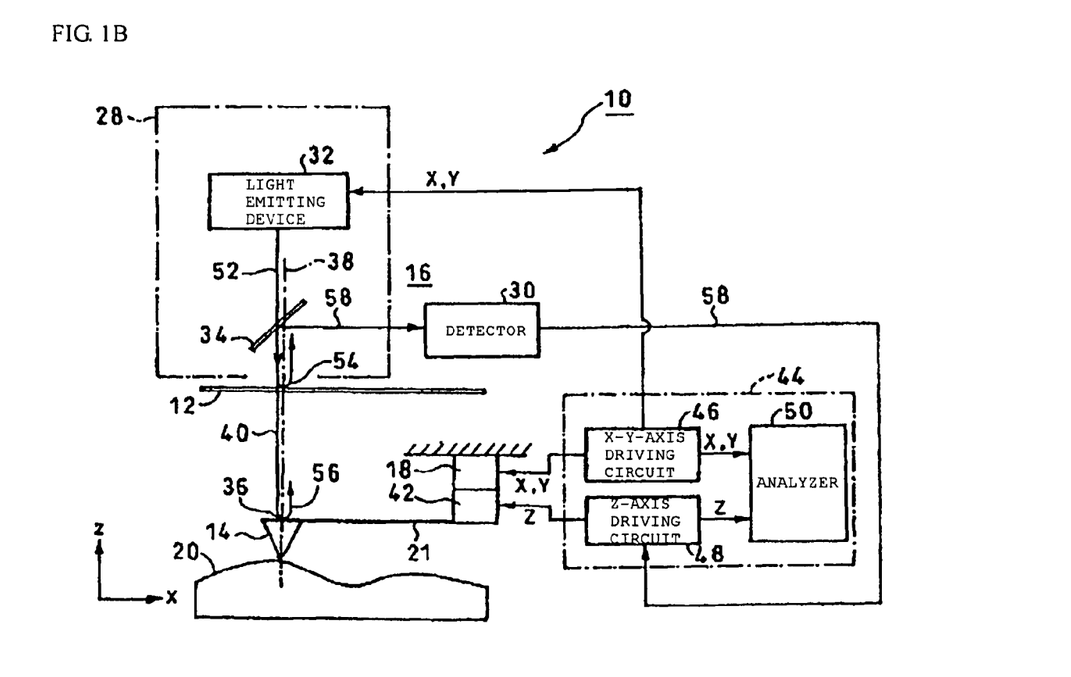

FIGS. 1A and 1B show an outline structure of a measuring apparatus 10 according to a first embodiment of the present invention. FIG. 1A is a perspective view of the measuring apparatus 10, and FIG. 1B is a side view of the measuring apparatus 10.

The measuring apparatus 10, which is a fine-shape measuring apparatus, includes a reference mirror (reference member) 12, a stylus 14, an interferometric displacement gauge (displacement gauge) 16, and a scanner 18.

The reference mirror 12 is used for the interferometric displacement gauge 16 and is as large as a measurement area of a workpiece 20. The reference mirror 12 is held in a fixed position and orientation with respect to the workpiece 20 during scanning (measurement). In the first embodiment, the workpiece 20 is placed on a base 22, and the reference mirror 12 is held in the fixed position and orientation with respect to the workpiece 20 by a holding member 24 secured on the base 22.

The stylus 14 is provided at a free end of a flexible cantilever 21. The other end of the cantilever 21 is fixed to the scanner 18. The stylus 14 travels on the workpiece 20 in the x direction, following the unevenness of the surface of the workpiece 20 in the z direction.

The interferometric displacement gauge 16 includes an interference optical system 28 and a detector 30. The interference optical system 28 includes a light emitting device 32 and a beam splitter 34. In the first embodiment, the beam splitter 34, the reference mirror 12, a specific part 36 of the stylus 14, and the tip of the stylus 14 are aligned in a straight line. The interferometric displacement gauge 16 measures the displacement of the specific part 36 of the stylus 14 from a position right above it, relative to the reference member 12. In the first embodiment, the specific part 36 is on the central axis of the stylus 14 in the rear surface of the cantilever 21, when the cantilever 21 is held in a horizontal position.

The scanner 18 causes the stylus 14 to scan the surface of the workpiece 20 in the X-Y direction.

In the first embodiment, the scanner 18 performs scanning while a displacement axis 38 of the specific part 36 of the stylus 14 in the Z direction and a measurement axis 40 on which the interferometric displacement gauge 16 measures a Z displacement of the specific part 36 of the stylus 14 are kept coincident with each other.

For that purpose, the first embodiment includes the scanner 18, a Z-axis driver 42, and a computer 44. The computer 44 includes an X-Y-axis driving circuit 46, a Z-axis driving circuit 48, and an analyzer 50.

The measuring apparatus 10 according to the first embodiment is structured in outline as described above, and the operation of the apparatus will now be described. In the following description, for the sake of simplicity, an X-Z plan view is used, and a displacement in the Z direction is measured by the stylus traveling in the direction of the X axis.

As shown in FIG. 1B, the stylus 14 of the cantilever 21 follows the surface of the workpiece 20 while the displacement axis 38 of the stylus 14 and the measurement axis 40 of the displacement gauge 16 are kept coincident with each other during scanning, and the amount of z displacement of the specific part 36 of the stylus 14 is measured.

In FIG. 1B, a laser beam (coherent light) 52, which is a collimated light beam, from the light emitting device 32 passes through the beam splitter 34 and reaches the reference mirror 12. A part of the laser beam 52 reaching the reference mirror 12 is reflected exactly upward by the reference mirror 12. In the first embodiment, light reflected by the reference mirror 12 is referred to as reference light 54. At least a part of the remaining part of the laser beam 52 passes through the reference mirror 12 and reaches the specific part 36 of the stylus 14. The laser beam 52 reaching the specific part 36 of the stylus 14 is reflected exactly upward and reaches the reference mirror 12. In the first embodiment, light reflected by the specific part 36 of the stylus 14 is referred to as measurement light 56.

At the reference mirror 12, the reference light 54 interferes with the measurement light 56. Interference light 58 thereof is reflected by the beam splitter 34 and is observed by the detector 30. This interference light 58 exhibits a change in interference intensity (light and shade) in accordance with the Z displacement of the specific part 36 of the stylus 14. The interference light 58, having the interference intensity information (light-and-shade information) as described above, is photoelectrically converted by the detector 30. Accordingly, the output of the detector 30 varies with the Z displacement of the specific part 36 of the stylus 14, in other words, the change in interference intensity. The Z displacement of the specific part 36 of the stylus 14 can be measured with the analyzer 50, which analyzes the change in interference intensity included in a change in output of the detector 30.

In the first embodiment, the displacement observation location is not fixed with respect to the workpiece 20 but is moved in accordance with scanning by the stylus 14 in the X direction (transverse direction) during scanning by the cantilever 21, so that the Z displacement of the specific part 36 of the stylus 14 can be observed from a position directly above the specific part 36 of the stylus 14. In the first embodiment, the stylus 14 and the displacement gauge 16 (especially the beam splitter 34) travel, with the workpiece 20 and the reference mirror 12 remaining at rest, and the displacement axis 38 and the measurement axis 40 are always kept coincident with each other even during this scanning.

In the first embodiment, the displacement of the specific part 36 of the stylus 14 can always be measured from a position directly above it during scanning. Therefore, in the first embodiment, the occurrence of a cosine error can be greatly reduced, and the displacement of the stylus 14 can be measured with high accuracy.

In the first embodiment, the reference mirror 12, which is as large as the measurement area of the workpiece 20, is fixed with respect to the workpiece 20. The Z displacement of the specific part 36 of the stylus 14 is measured with reference to the reference mirror 12, which is kept in the fixed position and orientation with respect to the workpiece 20.

As a result, in the first embodiment, when the stylus 14 is kept in contact with the surface of the workpiece 20, even if a motion error occurs in scanning by the cantilever 21, the cantilever 21 is just bent, and the motion error will not affect the measurement result of the workpiece 20. Therefore, the displacement of the stylus 14 can be measured with high accuracy in the first embodiment.

The shape of the surface of the workpiece 20 is obtained as a relative shape with respect to the reference mirror 12, in accordance with the obtained amount of relative displacement of the stylus 14 in the Z direction and the travel amount in the X direction from the scanner 18, so that the fine shape of the surface of the workpiece 20 can be measured with high accuracy.

Conversely, if the displacement observation location were moved together with the scanning stylus, the influence of the motion error would appear as the displacement observation location moves. In the conventional methods, the displacement caused by the motion error of the scanner is added to the displacement caused by unevenness of the workpiece, and therefore it has been difficult to measure the displacement of the stylus accurately.

If a plurality of displacement gauges were used for reducing the adverse effect of the motion error, the apparatus would increase in size, and the cost would also increase. Since the displacement axis of the stylus is different in position from the measurement axes of the displacement gauge, a cosine error occurs, making it difficult to measure the displacement with high accuracy.

Figure 2:
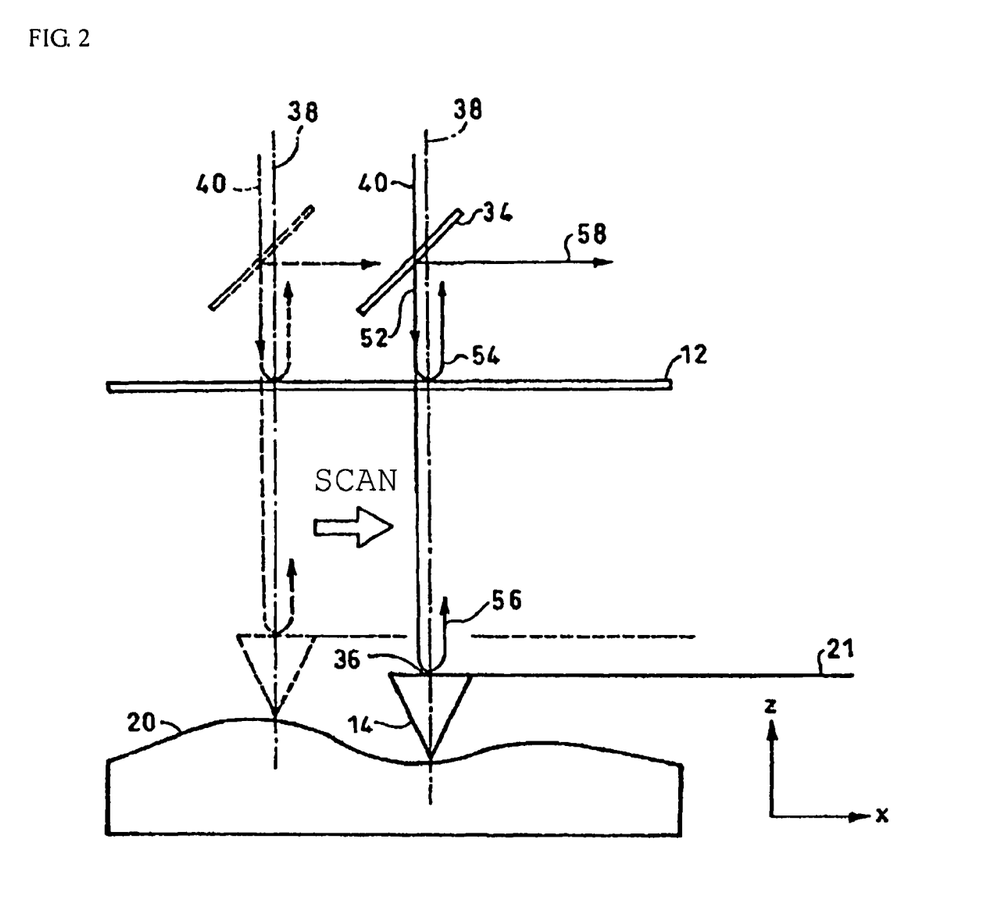
FIG. 2 is a diagram illustrating the operation of the measuring apparatus shown in FIGS. 1A and 1B.

In the first embodiment, the displacement of the stylus is detected as shown in FIG. 2. The figure shows that the reference light 54, that is, light reflected from the reference mirror 12, which is securely fixed with respect to the workpiece 20, interferes with the measurement light 56, that is, light reflected from the specific part 36 of the stylus 14, and the Z displacement of the specific part 36 is observed in accordance with the interference during scanning of the cantilever 21. In the figure, a dashed line represents a state before scanning, and a solid line represents a state after scanning.

As shown in the figure, when the cantilever 21 scans from the location represented by the dashed line to the location represented by the solid line, in the first embodiment, the displacement observation location also moves from the location represented by the dashed line to the location represented by the solid line.

In the first embodiment, the amount of shape unevenness of the workpiece 20 agrees with the amount of up-and-down movement of the back of the cantilever 21 (amount of up-and-down movement of the specific part 36) while the stylus 14 is kept in contact with the workpiece 20, thus enabling accurate displacement with respect to the reference mirror 12 to be measured.

The first embodiment destroys the established technical theory that the adverse effect of a motion error of the scanner on the result of displacement measurement can be reduced by improving the motion accuracy of the scanner. By performing scanning while the displacement axis of the stylus and the measurement axis of the displacement gauge are kept coincident with each other and by measuring the displacement of the stylus with reference to the reference mirror, which is held in the fixed position and orientation with respect to the workpiece, the adverse effect of the motion error of the scanner on the result of detection in the height direction can be avoided, and the cost can be lowered.

The operation will be described in further detail.

In the first embodiment, it is actually assumed that the stylus 14 of the cantilever 21 is pressed lightly against the surface of the workpiece 20 during scanning on the workpiece 20.

In that case, the motion error of the scanner 18 is affected by the up-and-down movement at the root of the cantilever 21.

If this type of motion error is within the range covered by the flexibility of the cantilever 21, the stylus 14 will not be separated from the surface of the workpiece 20.

In the first embodiment, when the stylus 14 is kept in contact with the workpiece 20, the shape of the workpiece 20 can be measured accurately, in spite of a motion error of the scanner 18. Therefore, it is most preferred in the first embodiment that the stylus 14 be provided at a free end of the flexible cantilever 21.

When the stylus 14 of the cantilever 21 is kept in contact with the workpiece 20, even if a motion error occurs in scanning by the cantilever in the first embodiment, the shape of the workpiece 20 is measured accurately at the reference mirror 12. The displacement is observed at the reference mirror 12 with the measurement axis 40 and the displacement axis 38 of the stylus 14 being kept coincident, and therefore, this measurement method is ideally implemented without a cosine error, in conformity with Abbe's measurement principle.

Conversely, in a conventional measuring apparatus, the displacement associated with the unevenness of the workpiece and the displacement associated with a motion error of the scanner are included in the measured z displacement. The motion error of the scanner depends on the accuracy of a guide face of the scanner for the workpiece or sensor and how the sensor or the workpiece moves with respect to the guide face. The unreliability of the measurement in the conventional method is very large in comparison with that in the present invention.

In another conventional method in which a plurality of displacement gauges are provided for reducing the effect of a guide motion error, the displacement is measured on the measurement axis which is not aligned with the displacement axis of the stylus, and a cosine error occurs. The first embodiment can perform measurement with higher accuracy than those conventional methods.

Figure 3:
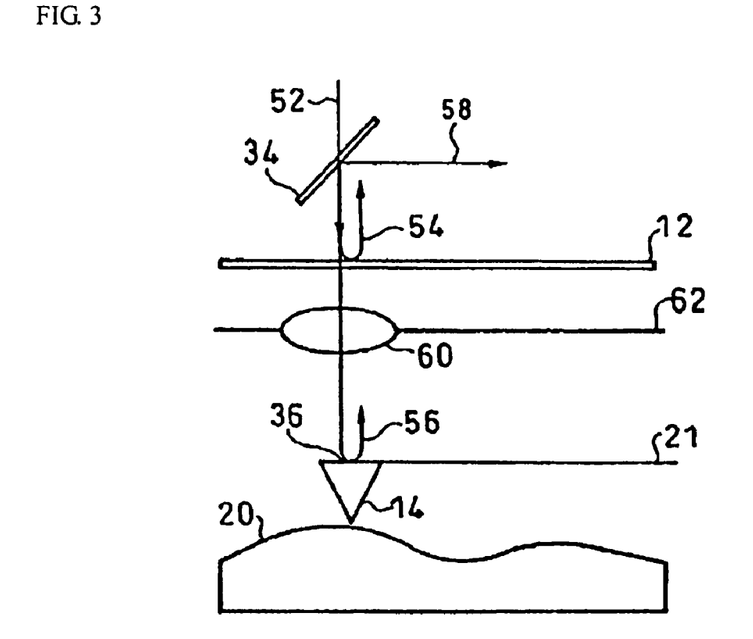
FIG. 3 is a diagram illustrating a modification of the measuring apparatus shown in FIGS. 1A and 1B.

If there is some concern about the effect of a change in inclination of the back (specific part 36) of the cantilever 21, caused by the bent stylus 14, it would be preferable to provide optical components as shown in FIG. 3 in the first embodiment.

The optical components shown in the figure are provided between the reference mirror 12 and the specific part 36 of the stylus 14 and include a condensing lens 60 which travels in the X direction together with the stylus 14. The condensing lens 60 focuses the laser beam 52, that is, a collimated light beam, onto the specific part 36 of the stylus 14 and allows the displacement of the specific part 36 of the stylus 14 to be observed at the focal point. The condensing lens 60 focuses the laser beam 52 from the reference mirror 12 to the specific part 36 of the stylus 14, collects light reflected from the specific part 36 of the stylus 14 as the measurement light 56, and emits the light directly upward, that is, along the measurement axis 40.

In the first embodiment, it is also preferable that the condensing lens 60 be scanned in the X direction within the laser beam 52, which is a collimated light beam in the z direction, for performing optical interference measurement with higher accuracy.

Figure 4:
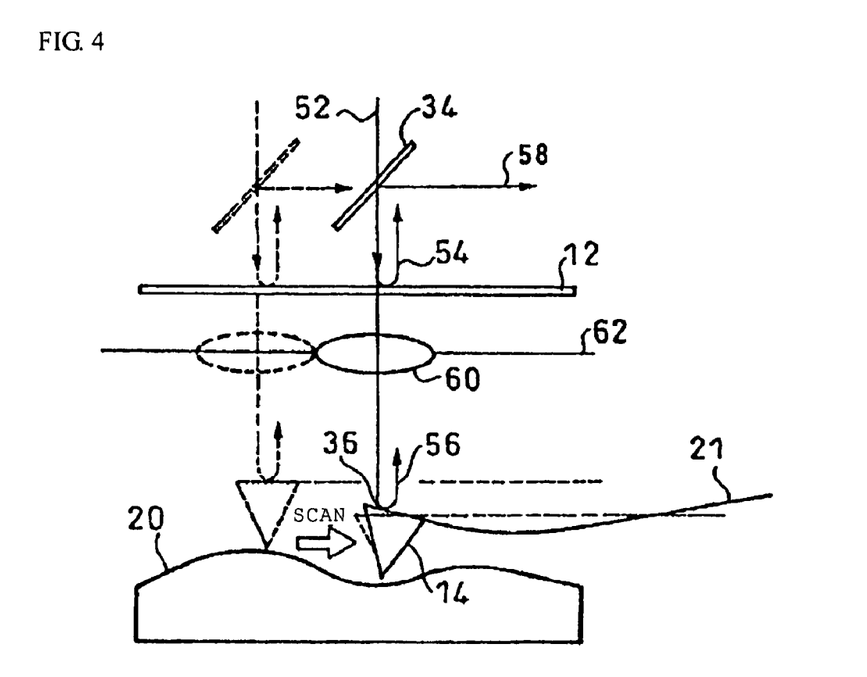
FIG. 4 is a diagram illustrating the operation of the measuring apparatus shown in FIG. 3.

Consequently, in the first embodiment, even if there is concern about the effect of a change in inclination of the back (specific part 36) of the cantilever 21, caused by the bent stylus 14, the measurement light 56, that is, light reflected from the specific part 36 of the stylus 14, is reliably collected by the condensing lens 60, as shown in FIG. 4, and this can be definitely observed from a location directly above the stylus 14, thus enabling accurate displacement to be measured.

It is also preferable to provide a light-shielding plate 62 in the first embodiment.

The light-shielding plate 62 blocks light other than light passing through the condensing lens 60.

In the first embodiment, by blocking light other than light passing through the condensing lens 60, just the specific part 36 of the stylus 14 can be measured with higher reliability.

In the first embodiment, even if the scanner 18 causes a motion error but the stylus 14 is not separated from the workpiece 20, the optical components described above geometrically cancel out the measurement error caused by the inclination of the back (specific part 36) of the cantilever 21, thus enabling accurate displacement of the stylus 14 to be measured.

Conversely, in the conventional systems, at least three displacement gauges would need to be provided to avoid the effect of inclination errors such as pitching and rolling of the stylus during scanning. The multiple displacement gauges, however, would complicate the structure for reducing the effect of inclination errors and would increase the manufacturing cost.

The optical components provided in the first embodiment, such as the condensing lens 60 and the light-shielding plate 62 described above, make it possible to reliably perform the displacement measurement characterizing the first embodiment, that is, scanning performed while the displacement axis 38 of the stylus 14 is kept coincident with the measurement axis 40 of the displacement gauge 16, and the measurement of the displacement of the stylus 14 with reference to the reference mirror 12, which is held in the fixed position and orientation with respect to the workpiece 20. This prevents motion errors such as an inclination error from adversely affecting the result of Z-displacement detection and ensures a reduced cost.

Modification

The present invention is not limited to the structures described above; other modifications, such as an addition or replacement of components, are possible within the scope of the invention.

For instance, in FIGS. 1 and 3, the beam splitter 34 and the light emitting device 32 of the interference optical system 28 and the detector 30 travel in the X direction, together with the scanning of the stylus 14 in the X direction. However, it is also preferable to secure the beam splitter 34 and move the condensing lens 60 and the stylus 14 only, as shown in FIG. 5.

In the figure, the laser beam 52 reaches the reference mirror 12 as collimated light which is as large as the measurement area of the workpiece 20. A part of the laser beam 52 passing through the reference mirror 12 is focused by the condensing lens 60 and reaches the specific part 36 of the stylus 14. The measurement light 56, that is, light reflected from the specific part 36 of the stylus 14, is collected by the condensing lens 60, reaches the reference mirror 12, and interferes with the reference light 54, that is, light reflected from the reference mirror 12. This structure reduces the size and weight of movable parts in comparison with the structures shown in FIGS. 1 and 3, thus allowing the scanner to be designed in a more desired manner.

If the interference optical system 28 and the stylus 14 are secured, whereas the reference mirror 12 and the workpiece 20 travel, high-accuracy displacement measurement can be performed without the influence of motion errors, as when the interference optical system 28 is secured, whereas the lens 60 and the stylus 14 travel.

Figure 5:
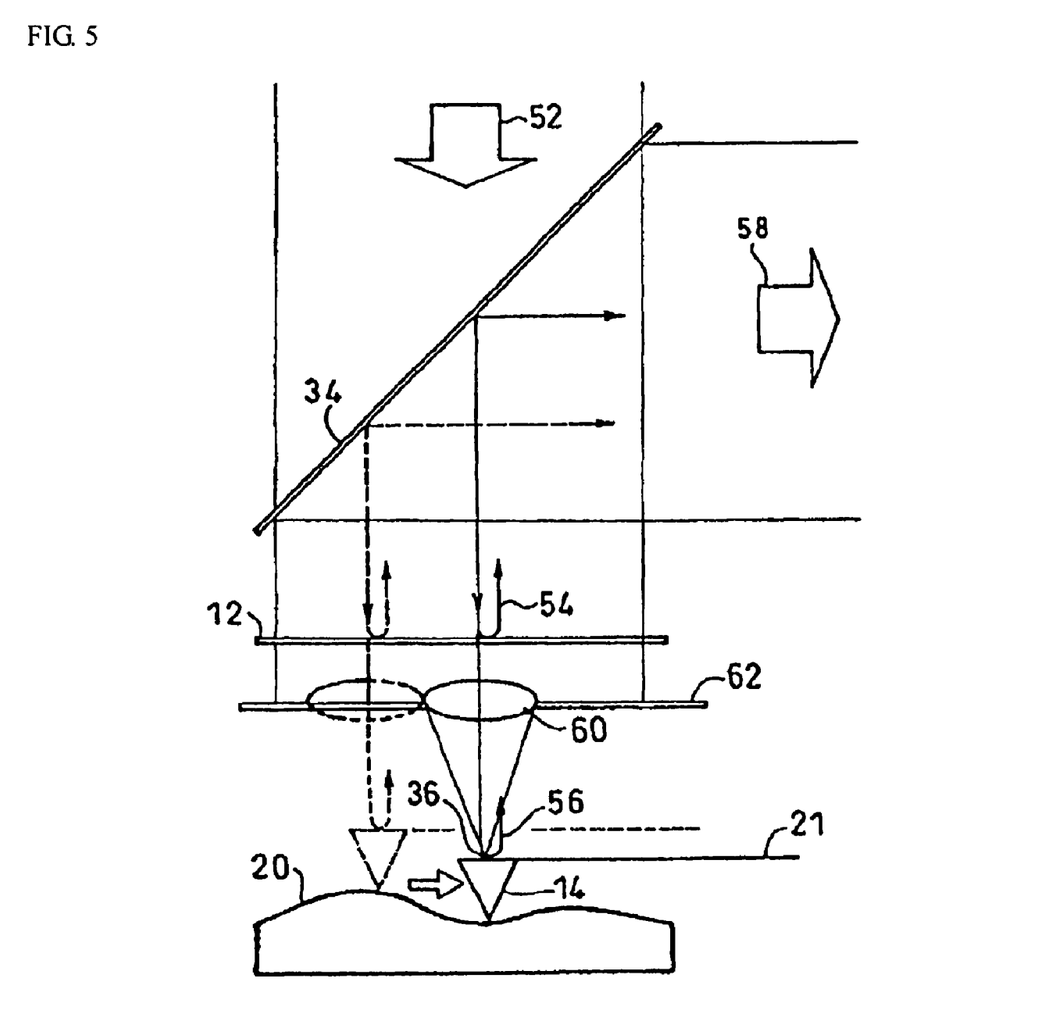
FIG. 5 is a diagram illustrating a modification of the measuring apparatus shown in FIG. 3.
Figure 6:
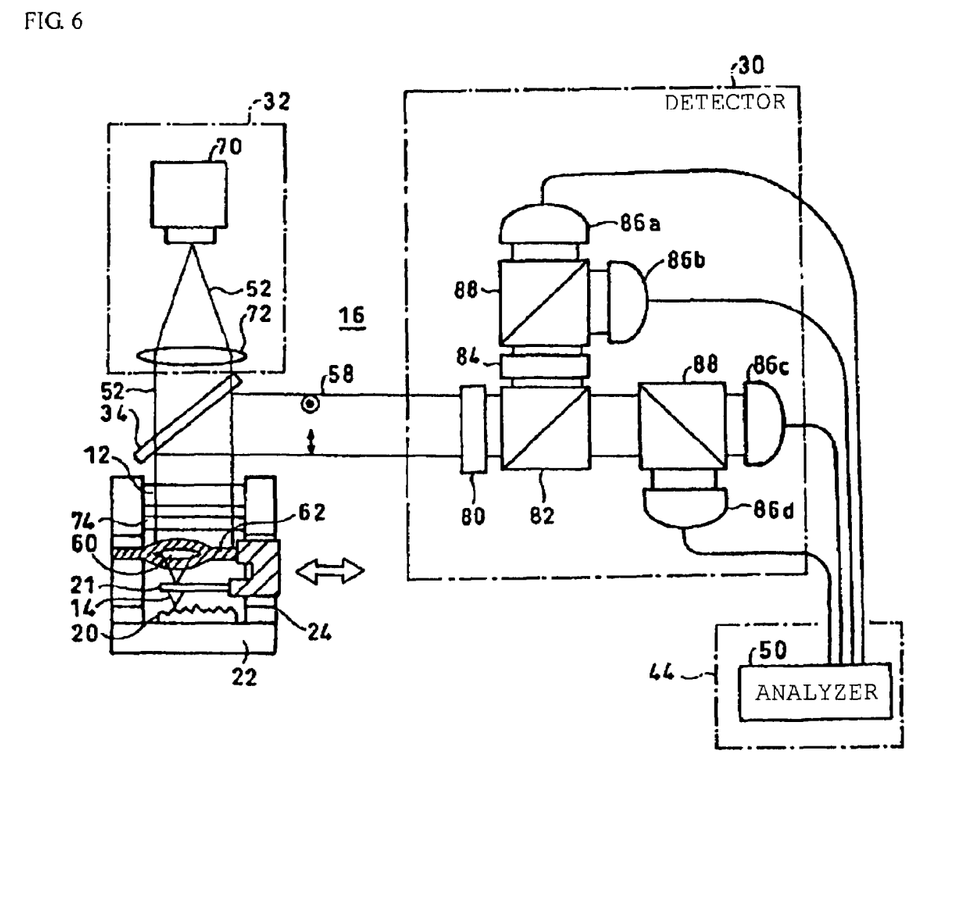
FIG. 6 shows a concrete example of the measuring apparatus shown in FIG. 5.

A more concrete example of the structure shown in FIG. 5 is shown in FIG. 6.

In the figure, the light emitting device 32 includes a laser light source 70 and a collimator lens 72.

In the figure, the collimator lens 72 converts the laser beam 52 from the laser light source 70 to a collimated light beam having a predetermined diameter corresponding to the size of a non-polarizing beam splitter 34. This collimated light beam passes through the beam splitter 34 and reaches the reference mirror 12. The light passing through the reference mirror 12 is focused by the condensing lens 60 and is directed onto the specific part 36 of the stylus 14. The measurement light 56, that is, light reflected from the specific part 36 of the stylus 14, is collected by the lens 60 and reaches the reference mirror 12. The reference mirror 12 superimposes the measurement light 56 on the reference light 54, that is, light reflected from the reference mirror 12, causing them to interfere. The interference light 58 thereof is reflected by the beam splitter 34 and detected by the detector 30. The detector 30 outputs an electrical signal whose level varies with a change in intensity of the received interference light 58.

The interference light 58 indicates the relative height between the reference mirror 12 and the surface of the workpiece 20 (Z displacement), obtained through the back (specific part 36) of the cantilever 21. When the stylus 14 is kept in contact with the workpiece 20, even if a motion error occurs in the scanner 18 as described above, the effect of the motion error will be eliminated because the relative positions of the reference mirror 12 and the workpiece 20 are unchanged.

Because the Z displacement of the stylus 14 is obtained from the interference light 58, it is also preferable to detect the phase of the interference, as described below.

As shown in FIG. 6, the light passing through the non-polarizing beam splitter 34 is split into the reference light 54 and light transmitted by the reference mirror 12. The transmitted light passes through an optical element 74 with its polarization plane rotated and then passes through the condensing lens 60. The lens 60 focuses the transmitted light onto the specific part 36 of the stylus 14. The measurement light 56, that is, light reflected from the specific part 36, passes through the lens 60, the optical element 74, and the reference mirror 12, and the reference mirror 12 extracts the reference light 54 and the measurement light 56. The reference light 54 and the measurement light 56 have polarization planes intersecting at right angles, and by observing a change in the phase difference therebetween, the Z displacement of the specific part 36 of the stylus 14 can be obtained, and therefore, the relative shape of the workpiece 20 with respect to the reference mirror 12 can be measured.

When the optical element 74 is a $\lambda/4$ plate, the polarization plane is rotated by 90° through a round trip of the laser beam 52.

When the optical element 74 is an element for splitting transmitted light and reflected light depending on their polarization, such as a wire-grid polarizing plate, the polarization of the reference light 54 and that of the measurement light 56 may be orthogonal to each other. In that case, if the transmitted light is used as the measurement light 56 and the reflected light is used as is as the reference light 54, the optical element 74 also functions as the reference mirror 12 shown in FIG. 1. Therefore, the optical element 74 and the reference mirror 12 can be implemented by a single optical element 74.

An example of calculating the phase difference in the interference signal will be described. In FIG. 6, it is assumed that the reference light and the measurement light are polarized horizontally and vertically to the plane of the drawing, and optical components placed in the plane of the drawing receive the interference light necessary for analyzing the phase difference.

In FIG. 6, the detector 30 includes a λ/2 plate 80, a non-polarizing beam splitter 82, a λ/4 plate 84, optical sensors 86a to 86d, and polarizing beam splitters 88.

In the figure, the λ/2 plate 80 rotates the polarization planes of the reference light and the measurement light by 45°, and the non-polarizing beam splitter 82 splits incident light into two light beams. Light transmitted through the non-polarizing beam splitter 82 is further split into two light beams by the polarizing beam splitter 88. When the light beams are received by the optical sensors 86c to 86d, information about interference intensities with a phase difference of 180° between the interference caused by transmission and the interference caused by reflection is obtained because of the properties of light. The λ/4 plate 84 is disposed on another optical path, that is, the reflection optical path, of the non-polarizing beam splitter 82, to shift the relative phase between the reference light and the measurement light. Light splitting by the polarizing beam splitter 88 generates a phase difference of 180° between the two interference intensities, and the effect of a relative phase delay of the λ/4 plate 84 further causes a phase difference of 90° with respect to the interference light generated by the transmitted light from the non-polarizing beam splitter 82. Therefore, the interference light beams received by the four optical sensors 86a to 86d have relative phase differences of 0°, 90°, 180°, and 270°.

To calculate the phase difference between the reference light and the measurement light from the four interference light beams obtained as described above, the analyzer 50 obtains interference-intensity differences between 0° and 180° and between 90° and 270° separately, the ratio between the differences, and the arctangent thereof.

In accordance with the obtained phase difference between the reference light and the measurement light, the Z displacement of the specific part 36 of the stylus 14 can be obtained. Therefore, the unevenness on the workpiece 20 can be detected in accordance with the Z displacement of the stylus 14.

<Scanning>

Figure 7:
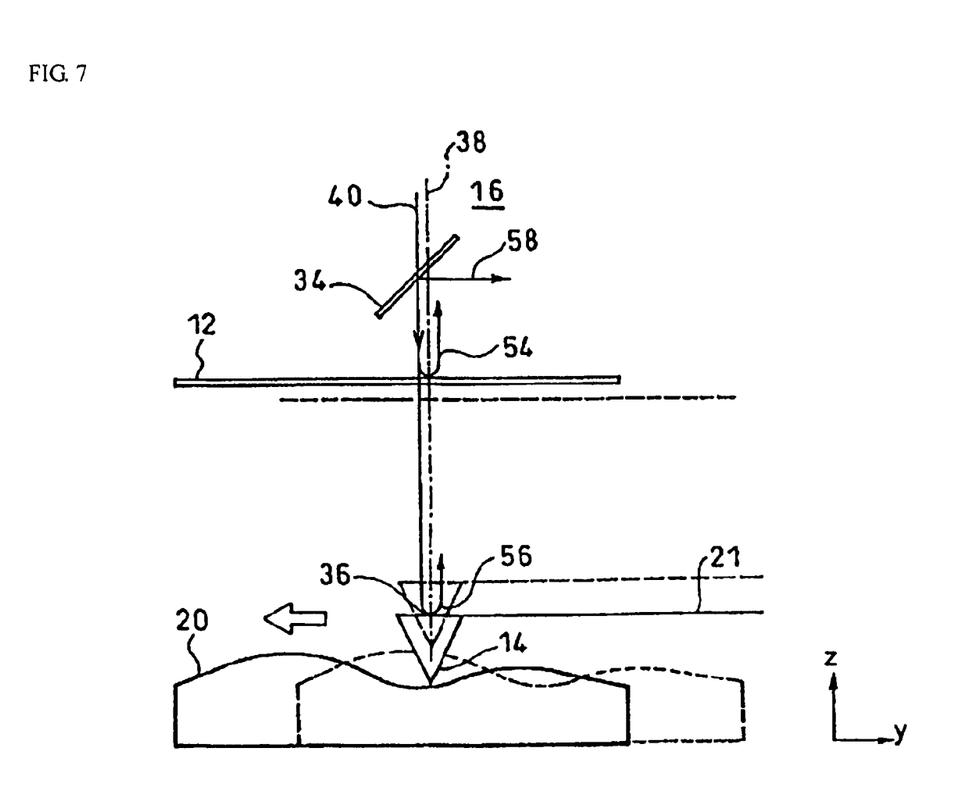
FIG. 7 shows a modification of a scanning method of the measuring apparatus shown in FIGS. 1A and 1B.

In the configuration described above, while the displacement axis 38 of the stylus 14 and the measurement axis 40 of the displacement gauge 16 are kept coincident with each other, the scanner 18 moves the stylus 14 and the displacement gauge 16 in the X direction with respect to the workpiece 20 and the reference mirror 12. The present invention is not limited to this configuration. However, it is also preferable that the workpiece 20 and the reference mirror 12 travel in the X direction with respect to the stylus 14 and the displacement gauge 16, as shown in FIG. 7.

The scanning measurement can be performed not only in the X-axis direction but also in the Y-axis direction to measure the uneven shape of the target object in a two-dimensional area.

Second Embodiment

Although an interferometric displacement gauge is used in the structures described above capacitive displacement gauge can also be used.

Figure 8:
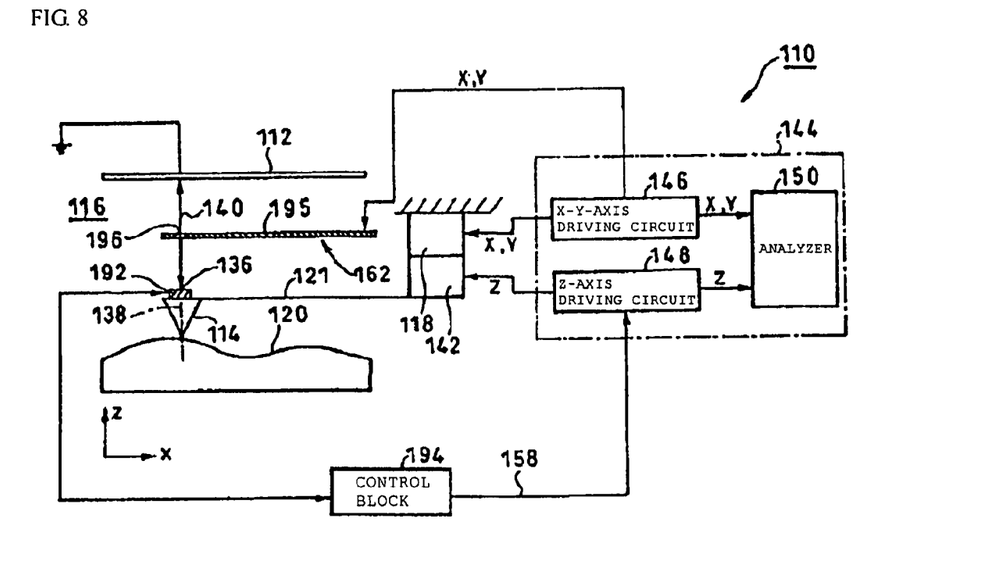
FIG. 8 is a diagram illustrating an outline structure of a measuring apparatus according to a second embodiment of the present invention.

FIG. 8 shows an outline structure of a measuring apparatus 110 using a capacitive displacement gauge, which is a fine-shape measuring apparatus. Components identical to those in the first embodiment will be denoted by reference numerals obtained by adding 100 to those of the first embodiment, and a description of those components will be omitted.

In the second embodiment, a capacitive displacement gauge 116 includes a ground-side flat electrode (reference member) 112 and a detection-side flat electrode 192, facing each other in parallel, and a control block 194.

In the second embodiment, the reference member is the ground-side flat electrode 11, and the detection-side flat electrode 192 is disposed in a specific part 136 of a stylus 114.

The capacitive displacement gauge 116 measures the capacitance between the flat electrodes 112 and 192 and outputs a capacitance signal 158 containing capacitance information. The capacitance signal 158 is input to a computer 144. The computer 144 detects the Z displacement of the specific part 136 of the stylus 114 in accordance with the capacitance information contained in the capacitance signal 158 and detects the Z displacement of the stylus 144 in accordance with the Z displacement of the specific part 136.

In the second embodiment, an electrostatic-shielding plate 162 serves as the shielding plate.

The electrostatic-shielding plate 162 includes a shielding portion 195 and a passing portion 196. The shielding portion 195 prevents a capacitance effect from occurring in regions other than between the ground-side flat electrode 112 and the specific part 136 of the stylus 114. The passing portion 196 allows a capacitance effect between the ground-side flat electrode 112 and the specific part 136 of the stylus 114 for measurement by the displacement gauge 116.

Figure 9:
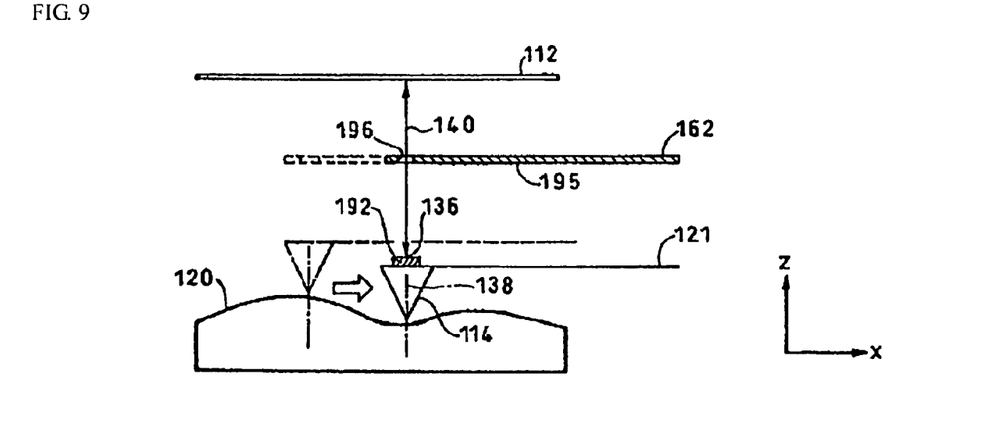
FIG. 9 is a diagram illustrating the operation of the measuring apparatus shown in FIG. 8.

The measuring apparatus 110 according to the second embodiment is structured in outline as described above, and the operation will be described below with reference to FIG. 9.

As shown in the figure, when the stylus 114 and the static-shielding plate 162 travel in the x direction with respect to a workpiece 120 and the ground-side flat electrode 112, the stylus 114 follows the surface of the workpiece 120, and the stylus 114 is displaced in the Z direction in accordance with the unevenness of the surface of the workpiece 120.

With the stylus 114, the detection-side flat electrode 192 is displaced in the Z direction, and the distance between the flat electrodes 112 and 192 varies. This also causes the capacitance between the flat electrodes 192 and 112 to change.

Accordingly, the displacement gauge 116 can obtain the distance between the flat electrodes 112 and 192 by measuring the capacitance between the flat electrodes 112 and 192.

For instance, the capacitance C between the flat electrodes 112 and 192 can be approximately expressed as $$C = \in \cdot S/L$$

where S is the opposing surface area of the flat electrodes 112 and 192, L is the distance between them, and $\in$ is the permittivity of a dielectric (air) between the electrodes 112 and 192.

If the area S and the permittivity $\in$ are constant, the distance L is inversely proportional to the capacitance C. Therefore, by measuring a change in capacitance between the flat electrodes 112 and 192, a change in distance L between the electrodes 112 and 192, that is, the Z displacement of the detection-side flat electrode 192 with reference to the ground-side flat electrode 112, can be obtained.

In the second embodiment, the shielding portion 195 of the electrostatic-shielding plate 162 prevents a capacitance effect from occurring in regions other than between the ground-side flat electrode 112 and the specific part 136 of the stylus 114.

The passing portion 196 of the electrostatic-shielding plate 162 allows a capacitance effect between the ground-side flat electrode 112 and the specific part 136 of the stylus 114 only. Therefore, the capacitive displacement gauge 116 can measure just the Z displacement of the specific part 136 of the stylus 114 with respect to the reference member, that is, the ground-side flat electrode 112, with high accuracy.

Like the first embodiment, the second embodiment performs scanning while a displacement axis 138 of the stylus 114 and a measurement axis 140 of the displacement gauge 116 are kept coincident with each other, so that the displacement can be measured with high accuracy.

Like the first embodiment, the second embodiment measures the displacement of the stylus 114 with reference to the reference member. Accordingly, the effect of any motion error in an actuator, such as the scanner 118 or a Z-axis driver 142, can be greatly reduced, and the displacement can be measured with high accuracy.

Like the first embodiment, the second embodiment allows high-accuracy measurement to be performed without improving the accuracy of an actuator, such as the scanner 118 or the Z-axis driver 142, and therefore, the cost can be reduced.

What is claimed is:

1. A measuring apparatus comprising:
   a reference member held in fixed position and orientation with respect to a workpiece during measurement;
   a stylus for scanning a surface of the workpiece while being displaced upward and downward in accordance with unevenness of the surface of the workpiece;
   a displacement gauge for measuring a displacement of a specific part of the stylus relative to the reference member; and
   a scanner for causing the stylus to scan the workpiece along the surface;
   wherein the fixed position and orientation of the reference member with respect to the workpiece are not changed even during the operation of the scanner;
   the up-and-down displacement of the specific part of the stylus is measured relative to the reference member;
   a fine shape of the workpiece is detected in accordance with the measured displacement of the specific part of the stylus,
   wherein the scanner scans the workpiece and the reference member with respect to the stylus and the displacement gauge or causes the stylus and the displacement gauge to travel with respect to the workpiece and the reference member during measurement while a displacement axis representing the direction of the up-and-down displacement of the stylus and a measurement axis along which the displacement gauge measures the displacement of the specific part of the stylus are kept coincident with each other.

2. A measuring apparatus according to claim 1,
   wherein the displacement gauge is an interferometric displacement gauge;
   the reference member is a reference mirror used for the interferometric displacement gauge;
   at least the reference mirror and the specific part of the stylus are aligned with a displacement axis of the stylus and a measurement axis of the displacement gauge; and
   the interferometric displacement gauge measures the displacement of the specific part of the stylus in accordance with interference occurring at the reference mirror, between light reflected from the reference mirror, obtained by directing a part of coherent light having a central axis aligned with the displacement axis and the measurement axis towards the reference mirror, and light passing through the reference mirror, reaching the specific part of the stylus, and reflected from the specific part of the stylus.

3. A measuring apparatus according to claim 2, further comprising a condensing lens for focusing the coherent light from the reference mirror to the specific part of the stylus, collecting reflected light thereof, and emitting the light directly upward, onto the measurement axis,
   wherein the condensing lens travels in a transverse direction together with the stylus.

4. A measuring apparatus according to claim 3, further comprising a light-shielding plate for blocking light other than light passing through the condensing lens,
   wherein the condensing lens travels in the transverse direction within the coherent light, which is a collimated light beam.

5. A measuring apparatus according to claim 1,
   wherein the displacement gauge is a capacitive displacement gauge comprising two flat electrodes;
   the reference member is one flat electrode of the two flat electrodes;
   the other flat electrode of the two flat electrodes is provided in the specific part of the stylus; and
   the capacitive displacement gauge measures the capacitance between the two flat electrodes and measures the displacement of the specific part of the stylus in accordance with the measured capacitance.

6. A measuring apparatus according to claim 5, further comprising an electrostatic-shielding plate for use in measurement of only the capacitance between the reference member and the specific part of the stylus.

7. A measuring apparatus according to claim 1, wherein the reference member is greater than or equal to the size of a measurement area of the workpiece.

8. A measuring apparatus according to claim 1, wherein the stylus is disposed at a free end of a flexible cantilever and is displaced up and down in contact with the workpiece.

* * * * *